United States Patent
Lee et al.

(10) Patent No.: US 7,906,590 B2
(45) Date of Patent: Mar. 15, 2011

(54) PROCESS TO FORM MODIFIED PIGMENTS

(75) Inventors: Sze-Ming Lee, Westford, MA (US); Dave S. Pope, Andover, MA (US)

(73) Assignee: Cabot Corporation, Boston, MA (US)

( * ) Notice: Subject to any disclaimer, the term of this patent is extended or adjusted under 35 U.S.C. 154(b) by 419 days.

(21) Appl. No.: 12/009,930

(22) Filed: Jan. 23, 2008

(65) Prior Publication Data

US 2008/0177003 A1  Jul. 24, 2008

Related U.S. Application Data

(60) Provisional application No. 60/897,194, filed on Jan. 24, 2007.

(51) Int. Cl.
C08F 8/30 (2006.01)

(52) U.S. Cl. .......... 525/329.9; 525/327.6; 523/160; 523/161; 106/31.6

(58) Field of Classification Search .......... 106/31.01, 106/31.6–31.69; 523/160, 161; 525/327.6, 525/329.9
See application file for complete search history.

(56) References Cited

U.S. PATENT DOCUMENTS

| | | | |
|---|---|---|---|
| 4,014,844 A | 3/1977 | Vidal et al. ............... 260/31.2 R |
| 4,946,509 A | 8/1990 | Schwartz et al. ............ 106/496 |
| 5,141,556 A | 8/1992 | Matrick |
| 5,281,261 A | 1/1994 | Lin et al. ..................... 106/20 R |
| 5,412,019 A | 5/1995 | Roulstone et al. ............ 524/497 |
| 5,418,277 A | 5/1995 | Ma et al. ....................... 524/520 |
| 5,534,585 A | 7/1996 | Roulstone et al. ............ 524/497 |
| 5,545,504 A | 8/1996 | Keoshkerian et al. ......... 430/137 |
| 5,698,016 A | 12/1997 | Adams et al. .................. 106/316 |
| 5,714,993 A | 2/1998 | Keoshkerian et al. .......... 347/95 |
| 5,795,376 A | 8/1998 | Ide et al. |
| 5,895,522 A | 4/1999 | Belmont et al. ............. 106/31.6 |
| 5,914,806 A | 6/1999 | Gordon II et al. ............. 359/296 |
| 5,952,429 A | 9/1999 | Ikeda et al. .................. 525/326.1 |
| 5,964,935 A | 10/1999 | Chen et al. .................... 106/401 |
| 6,042,643 A | 3/2000 | Belmont et al. ............. 106/472 |
| 6,054,238 A | 4/2000 | Little et al. .................. 430/108.2 |
| 6,068,688 A | 5/2000 | Whitehouse et al. ...... 106/31.65 |
| 6,103,380 A | 8/2000 | Devonport .................... 428/403 |
| 6,110,994 A | 8/2000 | Cooke et al. .................. 523/215 |
| 6,150,433 A | 11/2000 | Tsang et al. ................... 523/160 |
| 6,218,067 B1 | 4/2001 | Belmont ...................... 430/108.3 |
| 6,221,143 B1 | 4/2001 | Palumbo ...................... 106/31.6 |
| 6,221,932 B1 | 4/2001 | Moffatt et al. ................ 523/160 |
| 6,235,829 B1 | 5/2001 | Kwan .......................... 524/495 |
| 6,336,965 B1 | 1/2002 | Johnson et al. .............. 106/31.6 |
| 6,337,358 B1 | 1/2002 | Whitehouse et al. ......... 523/200 |
| 6,350,519 B1 | 2/2002 | Devonport .................... 428/403 |
| 6,372,820 B1 | 4/2002 | Devonport .................... 523/215 |
| 6,402,825 B1 | 6/2002 | Sun .............................. 106/473 |
| 6,432,194 B2 | 8/2002 | Johnson et al. .............. 106/499 |
| 6,458,458 B1 | 10/2002 | Cooke et al. .................. 428/407 |
| 6,472,471 B2 | 10/2002 | Cooke et al. .................. 525/165 |
| 6,478,863 B2 | 11/2002 | Johnson et al. .............. 106/31.6 |
| 6,479,571 B1 | 11/2002 | Cooke et al. .................. 523/215 |
| 6,494,943 B1 | 12/2002 | Yu et al. ..................... 106/31.65 |
| 6,506,245 B1 | 1/2003 | Kinney et al. ................. 106/493 |
| 6,534,569 B2 | 3/2003 | Mahmud et al. .............. 523/333 |
| 6,602,335 B2 | 8/2003 | Moffatt et al. ............... 106/31.8 |
| 6,605,359 B2 | 8/2003 | Robinson et al. ............. 428/447 |
| 6,641,656 B2 | 11/2003 | Yu et al. ....................... 106/493 |
| 6,664,312 B2 | 12/2003 | Devonport .................... 523/205 |
| 6,699,319 B2 | 3/2004 | Adams et al. ................. 106/476 |
| 6,723,783 B2 | 4/2004 | Palumbo et al. ............. 524/555 |
| 6,749,980 B2 | 6/2004 | Cheng et al. ............. 430/137.14 |
| 6,822,781 B1 | 11/2004 | Amici et al. .................. 359/296 |
| 6,833,026 B2 | 12/2004 | Palumbo ...................... 106/473 |
| 6,911,073 B2 | 6/2005 | Adams et al. ................. 106/476 |
| 6,916,367 B2 | 7/2005 | Palumbo ...................... 106/473 |
| 6,929,889 B2 | 8/2005 | Belmont .......................... 430/7 |
| 7,001,934 B2 | 2/2006 | Bromberg ..................... 523/160 |
| 7,005,461 B2 | 2/2006 | Sanada et al. |
| 7,030,174 B2 | 4/2006 | Yatake |
| 7,056,962 B2 | 6/2006 | Johnson et al. .............. 523/205 |
| 7,173,078 B2 | 2/2007 | Lamprey et al. ............. 523/215 |
| 7,175,946 B2 | 2/2007 | Step et al. ........................ 430/7 |
| 7,220,303 B2 | 5/2007 | Tyvoll ......................... 106/31.6 |
| 7,220,307 B2 * | 5/2007 | Kano et al. ................... 106/476 |
| 7,258,956 B2 | 8/2007 | Galloway et al. ............... 430/18 |
| 7,459,491 B2 | 12/2008 | Tyvoll et al. |
| 7,544,238 B1 | 6/2009 | Belmont |
| 7,655,707 B2 | 2/2010 | Ma |
| 2002/0147252 A1 | 10/2002 | Adams |
| 2003/0195291 A1 * | 10/2003 | Lamprey et al. ............. 524/495 |
| 2003/0217672 A1 * | 11/2003 | Palumbo ...................... 106/473 |
| 2004/0007152 A1 * | 1/2004 | Palumbo ...................... 106/31.6 |
| 2004/0007161 A1 | 1/2004 | Belmont et al. .............. 106/499 |
| 2004/0229975 A1 * | 11/2004 | Palumbo et al. ............. 523/160 |
| 2006/0178447 A1 | 8/2006 | Burns et al. ................... 523/160 |
| 2006/0189717 A1 | 8/2006 | Johnson et al. |
| 2006/0211791 A1 | 9/2006 | Burns et al. ................... 523/160 |
| 2007/0021530 A1 | 1/2007 | Palumbo ....................... 523/160 |
| 2007/0126839 A1 | 6/2007 | Kelly-Rowley et al. |
| 2007/0129463 A1 | 6/2007 | Ma et al. |

FOREIGN PATENT DOCUMENTS

| | | |
|---|---|---|
| EP | 0 677 556 A2 | 10/1995 |
| EP | 1 600 473 | 11/2005 |
| WO | WO01/25340 | 4/2001 |
| WO | WO 0192359 | 6/2001 |
| WO | WO 2006/086660 | 8/2006 |

* cited by examiner

Primary Examiner — David Wu
Assistant Examiner — Vu A Nguyen

(57) ABSTRACT

A method of forming a modified pigment comprising a pigment having attached at least one polymeric group is described. In one embodiment, a polymer, a pigment, a linking agent, and an optional activating agent are combined, and the linking agent is reacted with the polymer and the pigment to form the modified pigment. In another embodiment, a polymer melt is formed comprising a polymer and an optional plasticizer, and the polymer melt, a pigment, and an optional activating agent are combined, in any order, under high-intensity mixing conditions. Also disclosed are modified pigments having specific properties and inkjet ink compositions comprising them.

9 Claims, No Drawings

PROCESS TO FORM MODIFIED PIGMENTS

CROSS-REFERENCE TO RELATED APPLICATIONS

This patent application claims the benefit of U.S. Provisional Patent Application No. 60/897,194, filed Jan. 24, 2007.

BACKGROUND OF THE INVENTION

1. Field of the Invention

The present invention generally relates to modified pigments, to methods of forming modified pigments, and to inkjet ink compositions comprising modified pigments.

2. Description of the Related Art

With increased reliance on personal computers, consumption of printing supplies, such as paper and ink, has risen. In addition, the introduction of digital photography has motivated consumers to print pictures, further increasing consumer interest in printing supplies.

To meet the demand for printing, manufacturers have turned to various printing technologies, including laser printing and ink-jet printing. Laser printing typically relies on a dry pigment particulate that is motivated onto a media, such as paper, through electrostatic forces and subsequently heated to adhere the pigment to the paper in the desired pattern. Ink-jet printing and related printing technologies typically rely on liquid suspensions including dispersed pigment particulate. With ink-jet printing, the liquid suspension is typically motivated onto a media through micromechanical or thermal processes. Once the liquid suspension contacts the media, the liquid portion typically evaporates or disperses in the media, leaving particulate pigment in a desired pattern.

However, printing quality, such as resolution and cleanliness of a printed article, can decrease as a result of pigment agglomeration or an unstable suspension. For example, pigment agglomeration can reduce resolution and result in pigment being placed in unintended locations during laser printing processes. Similarly, pigment agglomeration or failure of the pigment particulate to remain dispersed in a suspension can result in pigment placement in undesired locations and thus, a degradation of image quality. In particular, pigment agglomeration or poor dispersement of pigment can clog printer heads, can produce unwanted spots in printed images, or can produce unwanted lines or blurred text.

As such, manufacturers of inks have turned to modified pigments. While such pigments have provided ink compositions having improved properties, these methods may be costly and may result in low levels of surface modification. Therefore, there is a need for improved methods of forming modified pigments.

SUMMARY OF THE INVENTION

The present invention relates to a method of forming a modified pigment which comprises a pigment having attached at least one polymeric group. The method comprises the steps of: i) combining at least one polymer and at least one pigment, and ii) reacting the polymer and the pigment to form the modified pigment. In one embodiment, in step i), a polymer, a pigment, a linking agent, and an optional activating agent are combined, and, in step ii) the linking agent is reacted with the polymer and the pigment to form the modified pigment. For this embodiment, the linking agent comprises a first reactive group and a second reactive group, wherein the first reactive group is capable of reacting with the pigment and the second reactive group is capable of reacting with the polymer.

In a second embodiment, in step i), a polymer melt is formed comprising a polymer and an optional plasticizer, and the polymer melt, a pigment, and an optional activating agent are combined, in any order, under high-intensity mixing conditions; and, in step ii) the polymer and the pigment are reacted to form the modified pigment. For this embodiment, the polymer comprises at least one reactive functional group capable of reacting with the pigment.

The present invention further relates to a modified pigment comprising a pigment having attached at least one polymeric group. In one embodiment, the modified pigment has a polymer attachment level of at least about 20% and an average particle size not greater than about 300 nm. In a second embodiment, the modified pigment has an average particle size not greater than about 300 nm and a large particle count not greater than about $1.0 \times 10^8$. Preferably, the modified pigment is prepared using the method of the present invention. The present invention further relates to inkjet ink compositions comprising these modified pigments.

It is to be understood that both the foregoing general description and the following detailed description are exemplary and explanatory only and are intended to provide further explanation of the present invention, as claimed.

DETAILED DESCRIPTION OF THE INVENTION

The present invention relates to modified pigments comprising a pigment having attached at least one polymeric group and methods of forming them.

The method of the present invention comprises the steps of: i) combining at least one polymer and at least one pigment, and ii) reacting the polymer and the pigment to form the modified pigment. The pigment is a solid material, generally in the form of a particulate or in a form readily formed into a particulate, such as a pressed cake. The pigment, which is substantially free from attached functional groups that are different from the chemical composition of the bulk material, can be selected for color or composition. The pigment can be any type of pigment conventionally used by those skilled in the art, such as carbonaceous black pigments and organic colored pigments including pigments comprising a blue, black, brown, cyan, green, white, violet, magenta, red, orange, or yellow pigment. Representative examples of black pigments include various carbon blacks (Pigment Black 7) such as channel blacks, furnace blacks and lamp blacks, and include, for example, carbon blacks sold under the Regal®, Black Pearls®, Elftex®, Monarch®, Mogul®, Vulcan® trademark, available from Cabot Corporation, such as Black Pearls® 2000, Black Pearls® 1400, Black Pearls® 1300, Black Pearls® 1100, Black Pearls® 1000, Black Pearls® 900, Black Pearls® 880, Black Pearls® 800, Black Pearls® 700, Black Pearls® L, Elftex® 8, Monarch® 1400, Monarch® 1300, Monarch® 1100, Monarch® 1000, Monarch® 900, Monarch® 880, Monarch® 800, Monarch® 700, Mogul® L, Regal® 330, Regal® 400, Vulcan® P, or any combinations thereof. Suitable classes of colored pigment include, for example, anthraquinones, phthalocyanine blues, phthalocyanine greens, diazos, monoazos, pyranthrones, perylenes, heterocyclic yellows, quinolonoquinolones, quinacridones, (thio)indigoids, or any combinations thereof. Such pigments are commercially available in either powder or press cake form from a number of sources including, BASF Corporation, Engelhard Corporation, or Sun Chemical Corporation. An example of another suitable colored pigment is described in the Colour Index, 3rd edition (The Society of Dyers and Colourists, 1982). Mixtures of pigments may also be used. Preferably the pigment is a cyan, magenta, or yellow organic pigment or a carbonaceous black pigment, such as carbon black.

The pigment can have a wide range of BET surface areas, as measured by nitrogen adsorption, depending on the desired properties of the pigment. In particular, the pigment can have a surface area in a range between about 100 m²/gram and about 1000 m²/gram. For example, the pigment can have a surface area in a range between about 150 m²/gram and about 750 m²/gram, such as between about 200 m²/gram and about 650 m²/gram. Often, a higher surface area corresponds to smaller particle size. When a higher surface area is not readily available for the desired application, the pigment can be subject to size reduction or comminution techniques, such as ball or jet milling, to reduce the pigment to a smaller particle size, if desired.

The pigment can be a nano-sized particulate, such as a particulate having an average particle size of about 3 nm to about 500 nm. In an exemplary embodiment, the pigment can have an average particle size of about 3 nm to about 200 nm, such as about 3 nm to about 100 nm, about 3 nm to about 50 nm, about 8 nm to about 30 nm, or even, about 10 nm to about 25 nm. In particular embodiments, the average particle size can be not greater than about 500 nm, such as not greater than about 200 nm, or not greater than about 150 nm.

The polymer used in the method of the present invention forms the polymeric group of the modified pigment and can be any polymeric material capable of being attached, directly or indirectly (through a linking group), to a pigment. The polymer can be a homopolymer, copolymer, terpolymer, or can contain any number of different repeating units, including a random polymer, alternating polymer, graft polymer, block polymer, hyperbranched or dendritic polymer, comb-like polymer, or any combination thereof. The polymer can have an average molecular weight (weight average molecular weight) of not greater than about 50,000. For example, the polymer can have an average molecular weight not greater than about 25,000, such as not greater than about 15,000. The polymer can also have an average molecular weight of at least about 1000. Also, the polymer may be in the form of a liquid, a powder, or a polymer melt, depending on the specific conditions used to prepare the modified pigment.

Examples of polymers that can be used in the method of the present invention include polyamine, polyamide, polycarbonate, polyelectrolyte, polyester, polyether (such as polyalkyleneoxide), polyol (such as polyhydroxybenzene and polyvinyl alcohol), polyimide, polymer containing sulfur (such as polyphenylene sulfide), acrylic polymer, polyolefin including those containing halogens (such as polyvinyl chloride and polyvinylidene chloride), fluoropolymer, polyurethane, polyacid, or salts or derivatives thereof, or any combination thereof. The polymer can also be a polyanhydride, comprising at least one anhydride functional group.

An example of a polyamine includes linear or branched polyamine, such as polyethyleneimine (PEI) or derivatives thereof; oligomers of ethyleneimine (such as pentaethylenehexamine, PEHA) or derivatives thereof; polyamidoamine (PAMAM), such as Starburst® polyamidoamine dendrimers; or any combination thereof.

An example of polyacid includes acrylic or methacrylic acid homo- and copolymer, including polyacrylic or polymethacrylic acid and poly(styrene-acrylic acid) or poly(styrene-methacrylic acid); or a hydrolyzed derivative of maleic anhydride-containing polymer, such as styrene-maleic acid polymer. For example, the polymer can be formed from an acrylic monomer. Preferably, the acid-functionalized polymer has an acid number of at least about 50, such as at least about 125, at least about 150, or even, at least about 200.

Preferably, the polymer comprises at least one functional group that provides the modified pigment with at least one desirable property. For example, the polymer can comprise a functional group that is hydrophilic to improve dispersion in aqueous solutions or is hydrophobic to improve dispersion in non-polar solutions. Also, the functional group can reduce agglomeration of the pigment, such as by steric interactions.

For example, the functional group may comprise at least one ionic group, ionizable group, or mixtures of an ionic group and an ionizable group. An ionic group can be either anionic or cationic and can be associated with a counterion of the opposite charge including inorganic or organic counterions, such as $Na^+$, $K^+$, $Li^+$, $NH_4^+$, $NR'_4{}^+$, acetate, $NO_3^-$, $SO_4^{-2}$, $R'SO_3^-$, $R'OSO_3^-$, $OH^-$, or $Cl^-$, where R' represents hydrogen or an organic group, such as a substituted or unsubstituted aryl or alkyl group. An ionizable group can be one that is capable of forming an ionic group in the medium of use.

Thus, the functional group may comprise at least one anionic or anionizable group. Anionic groups are negatively charged ionic groups that can be generated from groups having ionizable substituents that can form anions (anionizable groups), such as acidic substituents. The group also can include an anion in the salts of ionizable substituents. An example of an anionic group can include $—COO^-$, $—SO_3^-$, $—OSO_3^-$, $—HPO_3^-$; $—OPO_3^{-2}$, or $—PO_3^{-2}$. An example of an anionizable group can include $—COOH$, $—SO_3H$, $—PO_3H_2$, $—R'SH$, $—R'OH$, or $—SO_2NHCOR'$, where R' represents hydrogen or an organic group, such as a substituted or unsubstituted aryl or alkyl group. For example, the anionic or anionizable group can be a carboxylic acid group, an alkylsulfate group, or a salt thereof.

Alternatively, the functional group may comprise at least one cationic or cationizable group. Cationic groups are positively charged organic ionic groups that can be generated from ionizable substituents that can form cations (cationizable groups), such as protonated amines. For example, alkyl or aryl amines can be protonated in acidic media to form ammonium groups $—NR'_2H^+$, where R' represent an organic group, such as a substituted or unsubstituted aryl or alkyl group. In a particular example, the cationic or cationizable group can be an amine group or a salt thereof, such as a benzylamine, phenylethylamine, phenyleneamine, aminoalkylamine group such as an $—SO_2$-ALK1-NH-ALK2-$NH_2$ group, wherein ALK1 and ALK2, which can be the same or different, are C2-C8 alkylene groups.

Alternatively, or in combination, the polymer used in the method of the present invention may comprise at least one reactive functional group capable of reacting with the pigment. The reactive functional group of the polymer can be a nucleophilic group or an electrophilic group, depending on the nature of the reaction to attach the polymer to the pigment. For example, the reactive functional group of the polymer may be a carboxylic acid or ester, an acid chloride, a sulfonyl chloride, an acyl azide, an isocyanate, a ketone, an aldehyde, an anhydride, an amide, an imide, an imine, an α,β-unsaturated ketone, aldehyde, or sulfone, an alkyl halide, an epoxide, an alkyl sulfonate or sulfate such as a (2-sulfatoethyl)-sulfone group, an amine, a hydrazine, an alcohol, a thiol, a hydrazide, an oxime, a triazene, a carbanion, an aromatic compound which undergoes an addition-elimination reaction, salts or derivatives thereof, or any combination thereof. Specifically, the reactive functional group can include a carboxylic acid group, an amine group, or a salt thereof. In another example, the reactive functional group can include an anion or a cation selected from the ionic groups described below.

The reactive functional group can be part of the polymer or can be formed by a reaction with the polymer and a reagent comprising the reactive functional group, such as a linking agent, described in more detail below. In particular, the linking agent and the polymer can include complementary functional groups configured to react, such as through nucleophilic or electrophilic substitution or addition.

In the method of the present invention, the amount of the polymer and the pigment combined will depend on a variety of factors, including the type and molecular weight of the polymer and the type of pigment. Preferably, the polymer and the pigment are combined in a ratio of at least about 1.0 part polymer to 1.0 part pigment, such as a ratio of at least about 2.0 parts polymer to 1.0 part pigment, or a ratio of at least about 3.5 parts polymer to 1.0 part pigment. More preferably, the polymer and the pigment are combined in a ratio of not greater than about 6.5 parts polymer to 1.0 part pigment.

As described above, the method of the present invention comprises the steps of: i) combining a pigment and a polymer and ii) reacting the pigment and the polymer to form the modified pigment. In a first embodiment of this method, a linking agent and an optional activating agent are included in step i) and, in step ii), the linking agent is used to react the pigment and the polymer. Thus, for this embodiment, the method of the present invention comprises the steps of: i) combining, in any order, a polymer, a pigment, a linking agent, and an optional activating agent, and ii) reacting the linking agent with the polymer and the pigment to form the modified pigment. The polymer and the pigment can be any of those described above.

For this embodiment, the linking agent is a compound that links or joins the pigment and the polymer by reacting with both the pigment and the polymer and becoming part of the attached group of the resulting modified pigment. Thus, the linking agent preferably comprises a first reactive group which is capable of reacting with the polymer and further comprises a second reactive group which is capable of reacting with the pigment. The first and second reactive groups of the linking agent can be either a nucleophilic group or an electrophilic group, depending on the nature of the reactive functional group of the polymer and depending on the type of pigment, which are described above. In particular, the reactive groups of the linking agent may comprise a carboxylic acid or ester, an acid chloride, a sulfonyl chloride, an acyl azide, an isocyanate, a ketone, an aldehyde, an anhydride, an amide, an imide, an imine, an α,β-unsaturated ketone, aldehyde, or sulfone, an alkyl halide, an epoxide, an alkyl sulfonate or sulfate such as a (2-sulfatoethyl)-sulfone group, an amine, a hydrazine, an alcohol, a thiol, a hydrazide, an oxime, a triazene, a carbanion, an aromatic compound, salts or derivatives thereof, or any combination thereof. Particular examples of linking agents include amino-functionalized aromatic compounds, such as 4-aminobenzyl amine (4-ABA), 3-aminobenzyl amine (3-ABA), 2-aminobenzyl amine (2-ABA), 2-aminophenyl ethylamine, 4-aminophenyl-(2-sulfatoethyl)-sulphone, (APSES), p-aminobenzoic acid (PABA), 4-aminophthalic acid (4-APA), and 5-aminobenzene-1,2,3-tricarboxylic acid.

The reactive groups of the linking agent may either be capable of directly reacting with the pigment and/or the polymer or may be activated for this reaction, such as with they use of an activating agent, described below. For example, the first reactive group of the linking agent may comprise an amino-functional group, such as an aniline group, that is capable of reacting with a pigment, such as a carbon black pigment or can be activated for such a reaction, such as through a diazotization reaction. In another example, the first reactive group may comprise a hydrazide group. The first reactive group of the linking agent may also be capable of reacting with the pigment through a Diels-Alder cycloaddition reaction, through disulfide chemistry, through thionyl chloride chemistry, through an esterification reaction, through a Friedel-Craft reaction, through an amidation reaction, through an imidization reaction, or a variation thereof, depending on the nature of the pigment.

The second reactive group of the linking agent may be capable of reacting with the polymer through, for example, a condensation reaction. Thus, for example, the second reactive group may comprise a nucleophilic amine group capable of reacting with a polymer which comprises at least one reactive functional group, such as a carboxyl group, an anhydride group, a methyl ester group, an epoxy, an acrylate macromonomer, an unsubstituted carbamate, a chloromethylstyrene, a chlorosilane, an isocyanate, a melamine formaldehyde resin, or any combination thereof. Furthermore, the second reactive group of the linking agent may comprise a nucleophilic alcohol group capable of reacting with a polymer comprising at least one reactive functional group, such as a carboxyl group, an anhydride group, a methyl ester, an isocyanate, a chlorosilane, a melamine formaldehyde resin, or any combination thereof. In addition, the second reactive group of the linking agent may comprise a carboxyl group which can react with a polymer comprising a reactive functional group, such as an epoxy, a melamine formaldehyde resin, a hydroxyl group, an amino group, a thiol group, or any combination thereof. Also, the second reactive group of the linking agent may comprise an electrophilic sulfate group that is capable of reacting with a polymer comprising a reactive functional group, such as a hydroxyl group, an amino group, a thiol group, or any combination thereof.

The amount of linking agent can be varied depending on a variety of factors, including, for example, the amount and type of polymer and the amount and type of pigment. Preferably, the linking agent is combined in an amount of at least about 0.2 mmols of linking agent per gram of pigment. For example, the linking agent can be added in an amount of at least about 0.35 mmols of linking agent per gram of pigment, such as at least about 0.4 mmols of linking agent per gram of pigment.

For this embodiment of the method of the present invention, an optional activating agent may also be used. The activating agent is used to facilitate the reaction between the linking agent and at least one of the pigment or the polymer. For example, acid can be added as an activating agent to facilitate the reaction of the linking agent with the pigment. Suitable acids include organic acids such as methyl sulfonic acid; mineral acids such as nitric acid, sulfuric acid, halogen acids such as hydrochloric acid or hydrofluoric acid; or any combination thereof. Alternatively, the polymer can include sufficient acid groups to activate the reaction.

Another example of a suitable activating agent is a nitrite-containing reagent. For example, when the linking agent comprises an amine functional group capable of undergoing a diazonium reaction, a nitrite activating agent, such as an inorganic nitrite (e.g., sodium nitrite), an organic nitrite (e.g., isoamyl nitrite), or any combination thereof, may be added. An acid can also be used with the nitrite reagent.

As a result of the activation, the linking agent reacts with at least one of the pigment or the polymer. For example, when the linking agent comprises a functional group capable of undergoing a diazonium reaction and when the pigment is capable of reacting in a diazonium reaction, the linking agent can react with the pigment. Alternatively, when the polymer comprises a functional group capable of undergoing a diazonium reaction, which is a result of the reaction of the linking agent and the polymer, the pigment can react directly with the polymer. In particular, the method can be performed under high-intensity mixing conditions, described in more detail below.

For this embodiment, the polymer, the pigment, the linking agent, and the optional activating agent may be combined in any order. For example, to form the modified pigment having attached at least one polymeric group, the pigment and at least one polymer may be combined to form a mixture, followed by addition of the linking agent and the optional activating agent, to this mixture. Alternatively, the polymer and the linking agent, along with the optional activating agent, may be combined, and, this may then be combined with the pigment. Also, if the polymer is in the form of a polymer melt, the pigment, linking agent, and optional activating agent may be combined with this melt or added to the polymer prior to forming the melt. Other combinations are also possible.

In one preferred example of this embodiment of the method of the present invention, the modified pigment is formed in a slurry. For this method, herein referred to as the "slurry method", the polymer, the pigment, and a solvent are combined, in any order, to form a mixture. For example, the polymer, preferably in the form of a polymer powder, can be placed a mixer, preferably a high-intensity mixer such as a Brabender mixer, an extruder, or any of those described below, and the pigment is then added. The solvent is also added, either with pigment, with the polymer, or to the pigment/polymer combination. To this is then added the linking agent, and, optionally, an activating agent, in any order.

For this slurry method, a variety of different solvents can be used, and the type of solvent can be selected based on the nature of the pigment and the polymer. For example, the solvent can be a polar solvent, such as an aqueous solvent. Also, the solvent can be a polar organic solvent. Specific examples include alcohols such as methanol, ethanol, n-propanol, isopropanol, n-butanol, tertiary butanol, isobutanol, diacetone alcohol, or any combination thereof; glycols or glycol esters or ethers such as ethylene glycol, 2-ethoxyethanol, 3-methoxypropylpropanol, 3-ethoxypropylpropanol; ketones such as acetone, methyl ethyl ketone, diethyl ketone, methyl isobutyl ketone, or any combination thereof; ethers such as dibutyl ether, dioxane, or any combination thereof; nitrogen containing solvents including cyclic amides such as N-methyl pyrrolidone (NMP) and 2-pyrrolidone, triethanolamine, or any combination thereof; and water; or any combination thereof. For reaction chemistries that are influenced by pH, the solvent can be a protic solvent. Alternatively, the solvent can be a non-polar solvent or an aprotic solvent, such as an aliphatic hydrocarbon, such as linear or branched hydrocarbons having six or more carbon atoms or any combination thereof; halogenated aliphatic hydrocarbons, such as dichloromethane, carbon tetrachloride, chloroform, trichloroethane, or any combination thereof; an aromatic hydrocarbon, such as toluene, xylene, or any combination thereof; a halogenated aromatic hydrocarbon, such as chlorobenzene, dichlorobenzene, chlorotoluene, or any combination thereof; or natural oils, such as vegetable oil, sunflower oil, linseed oil, terpenes, fatty glycerides, or any combination thereof; or any combination thereof. The solvent can also be a blend of polar and non-polar solvents.

The solvent can be added to provide the mixture with a paste-like consistency. For example, the paste-like consistency can be characterized by a high-shear viscosity of at least about 10,000 cps (e.g., determined in accordance with DIN 53 019 with a shear rate of $10\,s^{-1}$). In particular, the viscosity can be at least about 100,000 cps, such as at least about 500,000 cps.

In addition, for this slurry method, heat can be used to activate the reaction. For example, the mixture of polymer and pigment may be combined with the linking agent and activated by heating the resulting combination to a temperature not greater than the boiling point of a solvent, if used. When the solvent is an aqueous solvent, the resulting combination can be heated to between about 25° C. and about 100° C., such as between about 50° C. and about 80° C. In a particular example, the reaction can be activated by adding acid, adding a nitrite, and heating, or any combination thereof.

For the slurry method, after the linking agent is reacted with the pigment, the resulting product can then be neutralized, the solvent removed, and the polymer reacted to form the modified pigment. For example, a base can be added to neutralize an acid used as an activating agent. Examples of suitable bases include lithium hydroxide, sodium hydroxide, potassium hydroxide, and tetraalkyl ammonium hydroxides. Other bases will be known to one skilled in the art, including low boiling amines as well as high boiling amines, which are preferred. In addition, the mixture can be heated to a temperature above the boiling point of the solvent to remove the solvent. Such an operation can be performed at atmospheric pressure or under vacuum. In particular, when the solvent is an aqueous solvent, the mixture can be heated to a temperature greater than 100° C. Further, the solvent can be removed under high-intensity mixing conditions.

In a second preferred example of this embodiment of the method of the present invention, the modified pigment is formed in a polymer melt. For this method, herein referred to as the "melt method", the polymer is added to a high-intensity mixer, such as a Brabender mixer, an extruder, or any of those described below, and heated to a temperature above the melting point of the polymer, forming a melt. To this is then added the pigment, the linking agent, and, optionally, an activating agent, in any order.

For this melt method, the polymer can have a melting point of at least about 25° C., such as at least about 50° C., including 100° C., 120° C. and even as high as 180° C. Furthermore, for high melting polymers, the melting point of the polymer can be modified by addition of a plasticizer. For example, a plasticizer can be added to the polymer in a range between about 0.1% and 20.0% based on the weight of the polymer, such as between about 2.0% and about 15.0% based on the weight of the polymer. With the plasticizer, the polymer can have a melting point not greater than about 120° C., such as about not greater than about 100° C., or even, as low as 70° C. Examples of suitable plasticizers include paraffin oil, N-methyl-pyrrolidone (NMP), 2-pyrrolidone (2P), dimethylformamide (DMF), cyclohexanone, propylene glycol monomethylether acetate (PMA), methyl isobutyl ketone (MIBK), ethylene glycol, urea, propylene glycol, dimethylsulfoxide (DMSO), water, or any combination thereof. In general, the plasticizer can be added to the polymer to form the polymer melt prior to adding the pigment. Alternatively, the plasticizer can be added in concert with adding the pigment or after adding the pigment.

For this melt method, the pigment can be added to the high-intensity mixer and blended with the melted polymer to form a mixture. Alternatively, the pigment can be mixed with the polymer, such as a polymer powder, to form the mixture and, subsequently, the polymer can be melted. In an example, the polymer and the pigment can be mixed in a ratio of at least about 1.0 part polymer to 1.0 part pigment, such as a ratio of at least about 2.0 parts polymer to 1.0 part pigment, or even, a ratio of at least about 3.5 parts polymer to 1.0 part pigment. In another example, the polymer and the pigment can be mixed in a ratio of not greater than about 6.5 parts polymer to 1.0 part pigment.

Also, for this melt method, the linking agent can be added to the polymer, either prior to or after forming the polymer melt. Also, the linking agent may be added prior to or after addition of the pigment. Since, as described above, the linking agent comprises a functional group capable of reacting with the polymer and a functional group capable of reacting with the pigment, if the linking agent is added prior to the addition of the pigment, the combination of polymer and linking agent can form a polymer comprising the functional group capable of reacting with the pigment. In a particular example, the linking agent comprises an amine functional group, such as an aniline group or a hydrazide group, capable of reacting with the pigment through a diazonium reaction.

Thus, in a second embodiment of the method of the present invention, which, as described above, comprises the steps of: i) combining a pigment and a polymer and ii) reacting the pigment and the polymer to form the modified pigment, in step i), a polymer melt is formed comprising a polymer and an optional plasticizer, and the polymer melt, a pigment, and an optional activating agent are combined, in any order, under high-intensity mixing conditions; and, in step ii) the polymer and the pigment are reacted to form the modified pigment. Thus, for this second embodiment, the method of the present invention comprises the steps of: i) forming a polymer melt comprising a polymer and an optional plasticizer; ii) combining, in any order, a pigment, an optional activating agent, and the polymer melt under high-intensity mixing conditions; and iii) reacting the polymer and the pigment to form the modified pigment.

For this embodiment, the pigment and the optional activating agent and plasticizer can be any of those described above. The polymer can be any of those described above that comprises at least one reactive functional group capable of reacting with the pigment. In particular, the polymer preferably comprises at least one amine functional group including, for example, amino-functionalized polymers having an amine number of about 5 to about 30 mg KOH/g. This polymer can be prepared by any method known in the art and, preferably, is prepared by the reaction of the polymer and a linking agent described above. Alternatively, the polymer can be prepared by a polymerization of a monomer comprising a functional group capable of reacting with the pigment.

For both embodiments of the method of the present invention, high-intensity mixing conditions may be used. Such conditions are particularly preferred, for example, when the polymer is in the form of a polymer melt or when a high viscosity mixture of polymer and pigment are formed. Suitable high-intensity mixing conditions can be achieved using a variety of high-intensity mixers or similar equipment that are designed to mix, blend, stir, homogenize, disperse, compound materials, or any combination thereof. Any mixer used for processing high viscosity materials can be used in the process of the present invention, not just those described traditionally as high-intensity mixers. Such equipment is described in Perry's Chemical Engineer's Handbook (7.sup.th Edition), Chapter 18, pages 18-25 to 18-32, which is incorporated in its entirety herein by reference. The high-intensity mixer can be a batch, a semi-continuous, or a continuous mixer. Typically, a continuous mixer offers both economic and practical advantages to batch processing equipment. An example of a high-intensity mixer can include a single or a double planetary mixer, a dual shaft planetary mixer (particularly one in which one shaft has a saw tooth blade), a helical mixer such as a double helical mixer or a twin blade conical mixer, a double arm kneading mixer such as a Brabender or a Farrel mixer, a high-intensity mixer such a Henschel or papenmeir mixer, two or three roll mixer, a single or a double (twin) screw extruder, or any combination thereof. The high-intensity mixing conditions can also include low-pressure conditions resulting from the use of a vacuum.

Also, for both embodiments, the reaction time and/or the reaction temperature can be varied depending on several factors, including, for example, the type of reactive group on the pigment, the type of linking agent, and the amounts of each reagent. Also, the type and molecular weight of the polymer can affect the reaction time and temperature. In general, the reaction can proceed over a time between about 0.1 minutes and about 300 minutes, preferably between about 1 minute and about 120 minutes, and more preferably between about 5 minutes and about 60 minutes.

In the method of the present invention, a modified pigment comprising the pigment having attached at least one polymeric group is produced, preferably as discrete particles. These modified pigments have been found to have advantageously desirable properties. For example, the polymer, once attached to the pigment as a polymeric group, can stabilize the pigment as a dispersion and, as a result, the modified pigment produced by the method of the present invention can have a small average particle size with low agglomeration. Alternatively, or in combination, the modified pigment can have high polymer attachment. In addition, the resulting modified pigment can utilize less energy and time to form a dispersion.

Thus, the present invention further relates to a modified pigment comprising a pigment having attached at least one polymeric group, as well as a dispersion comprising the modified pigment. In one embodiment, the modified pigment has a polymer attachment level of at least about 20% and an average particle size not greater than about 300 nm. In a second embodiment, the modified pigment, when in a dispersion, particularly an aqueous dispersion, has an average particle size not greater than about 300 nm and a large particle count not greater than about $1.0 \times 10^9$.

For example, the average particle size of the modified pigment in an aqueous dispersion is not greater than about 300 nm. Preferably, the average particle size is not greater than about 200 nm, more preferably not greater than about 150 nm, or even, not greater than about 120 nm.

Also, the agglomeration, as illustrated by a large particle count (defined herein as particles having a particle size greater than 500 nm), is low. For example, the particle count of particles greater than 500 nm per milliliter of dispersion at 15% solids is not greater than about $1.0 \times 10^9$. Preferably, the large particle count is not greater than about $5.0 \times 10^8$, such as not greater than about $2.5 \times 10^8$, or even, not greater than about $1.5 \times 10^8$. Large particle count can be measured using any technique known in the art, including, for example, using an optical particle sizer, such as an Accusizer 780 (available from PSS NICOMP).

In addition, the amount of polymeric group attached to the pigment has been found to be high, as indicated by the percent of attached polymer. For example, the polymer attachment can be at least about 10%, such as at least about 20%. In a particular example, the polymer attachment can be at least about 25%, or even, at least about 30%. The percent of polymer attachment can be determined using any technique known in the art. For example, attachment levels can be measured by extracting the modified pigment and determining the percentage of remaining attached polymer through thermal gravimetric analysis (TGA). Alternatively, the percent of polymer attachment can be determined through UV-Vis spectral analysis.

In a specific example of an extraction/TGA method, the sample of modified pigment is placed between filters in a sample cell, and the sample cell is loaded into a tray. The sample is exposed to a solvent for a period of between 0 and 99 minutes at a temperature of between 40° C. and 200° C. The sample cell is flushed with solvent, and approximately 0% to approximately 150% of the solvent is exchanged. This cycle is repeated between 1 and 5 times. Once the extraction is complete, the sample cell is flushed with nitrogen. Specific solvent, temperature, period, and solvent exchange can vary depending on the type of polymer attached to the pigment. For example, for acrylic polymers, typically the solvent is a THF-water mixture, the temperature is 80° C., the period is 45 minutes, and the solvent exchange is 150%. After extraction, the percent polymer attachment is determined by TGA. For example, the sample is heated to a temperature of 600° C., and changes in the sample weight are recorded. The percentage of attached polymer is represented by the percent loss in weight of the sample above 110° C.

When the modified pigment cannot be readily analyzed using the TGA method above, a UV-Vis spectral analysis can be used to determine the percentage of polymer attachment. Such a method is particularly useful for modified colored pigments, such as modified magenta, cyan, or yellow pigments. As a specific example, a 0.02 g sample of a dried modified magenta pigment is placed in a scintillation vial and mixed with 10 mL of concentrated sulfuric acid to form a first solution. Also, 15 mL of concentrated sulfuric acid and 700 microliters of the first solution are mixed in a second scintillation vial to form a second solution. The UV-Vis absorbance of the second solution at 605.6 nm is determined. The percent polymer attachment is determined by the following equation, wherein Wt. is the weight of the modified pigment and Abs. is the measured absorbance at 605.6 nm using a UV cell with a 0.5 cm path length.

$$\% \text{ Polymer Attachment} = 1 - \frac{0.012 \times \text{Abs}}{\text{Wt.}}$$

The modified pigment of the present invention, comprising a pigment having attached at least one polymeric group, can be used in a variety of applications. For example, the modified pigment can be dispersed in a vehicle and used in an ink or coating application. The vehicle can be either an aqueous or non-aqueous vehicle, depending on the nature of the attached polymer. In particular, the modified pigment can be used in inkjet ink compositions, particularly aqueous inkjet inks.

Thus, the present invention further relates to an inkjet ink composition comprising a) a liquid vehicle and b) a modified pigment of the present invention, comprising a pigment having attached at least one polymeric group. The liquid vehicle can be either an aqueous or non-aqueous liquid vehicle, but is preferably a vehicle that contains water. Thus, the liquid vehicle is preferably an aqueous vehicle, which is a vehicle that contains greater than 50% water and can be, for example, water or mixtures of water with water miscible solvents such as alcohols. Preferably the aqueous vehicle is water, and the inkjet ink composition is an aqueous inkjet ink composition.

The modified pigment can be any of those described above and is present in the inkjet ink composition in an amount effective to provide the desired image quality (for example, optical density) without detrimentally affecting the performance of the inkjet ink. Typically, the modified pigment can be present in an amount ranging from about 0.1% to about 30% based on the weight of the ink. More or less modified pigment may be used depending on a variety of factors. For example, the amount of modified pigment may vary depending on the amount of attached polymeric group. It is also within the bounds of the present invention to use a mixture of pigments, including, for example, the modified pigment described herein and unmodified pigments, other modified pigments, or both.

The inkjet ink composition of the present invention can be formed with a minimum of additional components (additives and/or cosolvents) and processing steps. However, suitable additives may be incorporated in order to impart a number of desired properties while maintaining the stability of the compositions. For example, surfactants and/or dispersants, humectants, drying accelerators, penetrants, biocides, binders, and pH control agents, as well as other additives known in the art, may be added. The amount of a particular additive will vary depending on a variety of factors but generally ranges between 0% and 40%.

Dispersing agents (surfactants and/or dispersants) may be added to further enhance the colloidal stability of the composition or to change the interaction of the ink with either the printing substrate, such as printing paper, or with the ink printhead. Various anionic, cationic and nonionic dispersing agents can be used in conjunction with the ink composition of the present invention, and these may be in solid form or as a water solution.

Representative examples of anionic dispersants or surfactants include, but are not limited to, higher fatty acid salts, higher alkyldicarboxylates, sulfuric acid ester salts of higher alcohols, higher alkyl-sulfonates, alkylbenzenesulfonates, alkylnaphthalene sulfonates, naphthalene sulfonates (Na, K, Li, Ca, etc.), formalin polycondensates, condensates between higher fatty acids and amino acids, dialkylsulfosuccinic acid ester salts, alkylsulfosuccinates, naphthenates, alkylether carboxylates, acylated peptides, α-olefin sulfonates, N-acrylmethyl taurine, alkylether sulfonates, secondary higher alcohol ethoxysulfates, polyoxyethylene alkylphenylether sulfates, monoglycylsulfates, alkylether phosphates and alkyl phosphates. For example, polymers and copolymers of styrene sulfonate salts, unsubstituted and substituted naphthalene sulfonate salts (e.g. alkyl or alkoxy substituted naphthalene derivatives), aldehyde derivatives (such as unsubstituted alkyl aldehyde derivatives including formaldehyde, acetaldehyde, propylaldehyde, and the like), maleic acid salts, and mixtures thereof may be used as the anionic dispersing aids. Salts include, for example, $Na^+$, $Li^+$, $K^+$, $Cs^+$, $Rb^+$, and substituted and unsubstituted ammonium cations. Specific examples include, but are not limited to, commercial products such as Versa® 4, Versa® 7, and Versa® 77 (National Starch and Chemical Co.); Lomar® D (Diamond Shamrock Chemicals Co.); Daxad®19 and Daxad® K (W. R. Grace Co.); and Tamol® SN (Rohm & Haas). Representative examples of cationic surfactants include aliphatic amines, quaternary ammonium salts, sulfonium salts, phosphonium salts and the like.

Representative examples of nonionic dispersants or surfactants that can be used in ink jet inks of the present invention include fluorine derivatives, silicone derivatives, acrylic acid copolymers, polyoxyethylene alkyl ether, polyoxyethylene alkylphenyl ether, polyoxyethylene secondary alcohol ether, polyoxyethylene styrol ether, polyoxyethylene lanolin derivatives, ethylene oxide derivatives of alkylphenol formalin condensates, polyoxyethylene polyoxypropylene block polymers, fatty acid esters of polyoxyethylene polyoxypropylene alkylether polyoxyethylene compounds, ethylene glycol fatty acid esters of polyethylene oxide condensation type, fatty acid monoglycerides, fatty acid esters of polyglycerol, fatty acid esters of propylene glycol, cane sugar fatty acid esters, fatty acid alkanol amides, polyoxyethylene fatty acid amides and polyoxyethylene alkylamine oxides. For example, ethoxylated monoalkyl or dialkyl phenols may be used, such as Igepal® CA and CO series materials (Rhone-Poulenc Co.) Briji® Series materials (ICI Americas, Inc.), and Triton® series materials (Union Carbide Company). These nonionic surfactants or dispersants can be used alone or in combination with the aforementioned anionic and cationic dispersants.

The dispersing agents may also be a natural polymer or a synthetic polymer dispersant. Specific examples of natural polymer dispersants include proteins such as glue, gelatin, casein and albumin; natural rubbers such as gum arabic and tragacanth gum; glucosides such as saponin; alginic acid, and alginic acid derivatives such as propyleneglycol alginate, triethanolamine alginate, and ammonium alginate; and cellulose derivatives such as methyl cellulose, carboxymethyl cellulose, hydroxyethyl cellulose and ethylhydroxy cellulose. Specific examples of polymeric dispersants, including synthetic polymeric dispersants, include polyvinyl alcohols; polyvinylpyrrolidones; acrylic or methacrylic resins (often written as "(meth)acrylic") such as poly(meth)acrylic acid, acrylic acid-(meth)acrylonitrile copolymers, potassium (meth)acrylate-(meth)acrylonitrile copolymers, vinyl acetate-(metha)acrylate ester copolymers and (meth)acrylic acid-(meth)acrylate ester copolymers; styrene-acrylic or methacrylic resins such as styrene-(meth)acrylic acid copolymers, styrene-(meth)acrylic acid-(meth)acrylate ester copolymers, styrene-α-methylstyrene-(meth)acrylic acid copolymers, styrene-α-methylstyrene-(meth)acrylic acid-(meth)acrylate ester copolymers; styrene-maleic acid copolymers; styrene-maleic anhydride copolymers, vinyl naphthalene-acrylic or methacrylic acid copolymers; vinyl naphthalene-maleic acid copolymers; and vinyl acetate copolymers such as vinyl acetate-ethylene copolymer, vinyl acetate-fatty acid vinyl ethylene copolymers, vinyl acetate-maleate ester copolymers, vinyl acetate-crotonic acid copolymer and vinyl acetate-acrylic acid copolymer; and salts thereof.

Humectants and water soluble organic compounds may also be added to the inkjet ink composition of the present invention, particularly for the purpose of preventing clogging of the nozzle as well as for providing paper penetration (penetrants), improved drying (drying accelerators), and anti-cockling properties. Specific examples of humectants and other water soluble compounds that may be used include low molecular-weight glycols such as ethylene glycol, diethylene glycol, triethylene glycol, tetraethylene glycol and dipropylene glycol; diols containing from about 2 to about 40 carbon atoms, such as 1,3-pentanediol, 1,4-butanediol, 1,5-pentanediol, 1,4-pentanediol, 1,6-hexanediol, 1,5-hexanediol, 2,6-hexanediol, neopentylglycol (2,2-dimethyl-1,3-propanediol, 1,3-propanediol, 1,4-butanediol, 1,5-pentanediol, 1,6-hexanediol, 1,2,6-hexanetriol, poly(ethylene-co-propylene) glycol, and the like, as well as their reaction products with alkylene oxides, including ethylene oxides, including ethylene oxide and propylene oxide; triol derivatives containing from about 3 to about 40 carbon atoms, including glycerine, trimethylolpropane, 1,3,5-pentanetriol, 1,2,6-hexanetriol, and the like as well as their reaction products with alkylene oxides, including ethylene oxide, propylene oxide, and mixtures thereof; neopentylglycol, (2,2-dimethyl-1,3-propanadiol), and the like, as well as their reaction products with alkylene oxides, including ethylene oxide and propylene oxide in any desirable molar ratio to form materials with a wide range of molecular weights; thiodiglycol; pentaerythritol and lower alcohols such as ethanol, propanol, iso-propyl alcohol, n-butyl alcohol, sec-butyl alcohol, and tert-butyl alcohol, 2-propyn-1-ol (propargyl alcohol), 2-buten-1-ol, 3-buten-2-ol, 3-butyn-2-ol, and cylcopropanol; amides such as dimethyl formaldehyde and dimethyl acetamide; ketones or ketoalcohols such as acetone and diacetone alcohol; ethers such as tetrahydrofuran and dioxane; cellosolves such as ethylene glycol monomethyl ether and ethylene glycol monoethyl ether, triethylene glycol monomethyl (or monoethyl) ether; carbitols such as diethylene glycol monomethyl ether, diethylene glycol monoethyl ether, and diethylene glycol monobutyl ether; lactams such as 2-pyrrolidone, N-methyl-2-pyrrolidone and ε-caprolactam; urea and urea derivatives; inner salts such as betaine, and the like; thio(sulfur) derivatives of the aforementioned materials including 1-butanethiol; t-butanethiol 1-methyl-1-propanethiol, 2-methyl-1-propanethiol; 2-methyl-2-propanethiol; thiocyclopropanol, thioethyleneglycol, thiodiethyleneglycol, trithio- or dithio-diethyleneglycol, and the like; hydroxyamide derivatives, including acetylethanolamine, acetylpropanolamine, propylcarboxyethanolamine, propylcarboxy propanolamine, and the like; reaction products of the aforementioned materials with alkylene oxides; and mixtures thereof. Additional examples include saccharides such as maltitol, sorbitol, gluconolactone and maltose; polyhydric alcohols such as trimethylol propane and trimethylol ethane; N-methyl-2-pyrrolidene; 1,3-dimethyl-2-imidazolidinone; sulfoxide derivatives containing from about 2 to about 40 carbon atoms, including dialkylsulfides (symmetric and asymmetric sulfoxides) such as dimethylsulfoxide, methylethylsulfoxide, alkylphenyl sulfoxides, and the like; and sulfone derivatives (symmetric and asymmetric sulfones) containing from about 2 to about 40 carbon atoms, such as dimethylsulfone, methylethylsulfone, sulfolane (tetramethylenesulfone, a cyclic sulfone), dialkyl sulfones, alkyl phenyl sulfones, dimethylsulfone, methylethylsulfone, diethylsulfone, ethylpropylsulfone, methylphenylsulfone, methylsulfolane, dimethylsulfolane, and the like. Such materials may be used alone or in combination.

Biocides and/or fungicides may also be added to the inkjet ink composition of the present invention. Biocides are important in preventing bacterial growth since bacteria are often larger than ink nozzles and can cause clogging as well as other printing problems. Examples of useful biocides include, but are not limited to, benzoate or sorbate salts, and isothiazolinones.

Various polymeric binders can also be used in conjunction with the inkjet ink composition of the present invention to adjust the viscosity of the composition as well as to provide other desirable properties. Suitable polymeric binders include, but are not limited to, water soluble polymers and copolymers such as gum arabic, polyacrylate salts, polymethacrylate salts, polyvinyl alcohols, hydroxypropylenecellulose, hydroxyethylcellulose, polyvinylpyrrolidinone, polyvinylether, starch, polysaccharides, polyethyleneimines with or without being derivatized with ethylene oxide and propylene oxide including the Discole® series (DKS International); the Jeffamine® series (Huntsman); and the like. Additional examples of water-soluble polymer compounds include various dispersants or surfactants described above, including, for example, styrene-acrylic acid copolymers, styrene-acrylic acid-alkyl acrylate terpolymers, styrene-methacrylic acid copolymers, styrene-maleic acid copolymers, styrene-maleic acid-alkyl acrylate terpolymers, styrene-methacrylic acid-alkyl acrylate terpolymers, styrene-maleic acid half ester copolymers, vinyl naphthalene-acrylic acid copolymers, alginic acid, polyacrylic acids or their salts and their derivatives. In addition, the binder may be added or present in dispersion or latex form. For example, the polymeric binder may be a latex of acrylate or methacrylate copolymers or may be a water dispersible polyurethane.

Various additives for controlling or regulating the pH of the inkjet ink composition of the present invention may also be used. Examples of suitable pH regulators include various amines such as diethanolamine and triethanolamine as well as various hydroxide reagents. An hydroxide reagent is any reagent that comprises an $OH^-$ ion, such as a salt having an hydroxide counterion. Examples include sodium hydroxide, potassium hydroxide, lithium hydroxide, ammonium hydroxide, and tetramethyl ammonium hydroxide. Other hydroxide salts, as well as mixtures of hydroxide reagents, can also be used. Furthermore, other alkaline reagents may also be used which generate $OH^-$ ions in an aqueous medium. Examples include carbonates such as sodium carbonate, bicarbonates such as sodium bicarbonate, and alkoxides such as sodium methoxide and sodium ethoxide. Buffers may also be added.

Additionally, the inkjet ink composition of the present invention may further incorporate dyes to modify color balance and adjust optical density. Such dyes include food dyes, FD&C dyes, acid dyes, direct dyes, reactive dyes, derivatives of phthalocyanine sulfonic acids, including copper phthalocyanine derivatives, sodium salts, ammonium salts, potassium salts, lithium salts, and the like.

The inkjet ink composition can be purified and/or classified using methods such as those described above for the modified pigments of the present invention. An optional counterion exchange step can also be used. In this way, unwanted impurities or undesirable large particles can be removed to produce an ink with good overall properties.

The present invention will be further clarified by the following examples which are intended to be only exemplary in nature

EXAMPLES

Examples 1-9

For each of these examples, a modified carbon black pigment was prepared using Black Pearls® 700 carbon black (available from Cabot Corporation) and either Joncryl® 67 or Joncryl® 683 (both acrylic polymers available from BASF). The modified pigments were prepared using one of the following general methods.

Method A

For this method, a mixture of the pigment in a melt of the polymer with N-methyl pyrrolidone (NMP) as a plasticizer was prepared in a Brabender mixer (ratio of 5 grams of polymer to 1 gram of pigment, NMP in an amount of 0.0 to 0.2 grams per gram of polymer). To this was added 4-aminobenzylamine (4-ABA) as the lining agent in an amount of 0.4 mmoles per gram of pigment. In addition, sodium nitrite was added as an activating agent, as a 20% solution in water, in an amount of 1.0 to 2.0 moles/mole of ABA. Optionally, methyl sulfonic acid as a 50% aqueous solution was also added in an amount of 1.0 to 2.0 moles/mole of ABA. The resulting combination was then heated to a temperature of 60° C. to 100° C. for a period of 30 minutes while mixing at a rate of 5 to 60 rpm. When an acid was used, sodium hydroxide was then added in an amount of 0.5 to 1.0 mole/mole of methyl sulfonic acid. The combination was further heated to a temperature of 140° C. to 175° C. for a period of 30 to 105 minutes while mixing at a rate of between 30 and 60 rpm.

While not wishing to be bound by theory, it is believed that, under the first heating conditions, the first reactive group of the linking agent reacts with the pigment through a diazonium reaction and, under the second heating conditions, the second reactive group of the linking agent reacts with the polymer, thereby forming a modified pigment comprising a pigment having an attached polymeric group.

Method B

For this method, the pigment and an aqueous slurry of the polymer were mixed in a Brabender mixer (ratio of 5 grams of polymer per gram of pigment, water in an amount of 1.7 to 3.2 grams/gram of pigment). To this was added 4-amino-benzylamine (4-ABA) as the linking agent in an amount of 0.4 mmoles per gram of pigment. In addition, sodium nitrite was added as an activating agent, as a 20% solution in water, in an amount of 1.0 to 2.0 moles/mole of ABA. Optionally, methyl sulfonic acid as a 50% aqueous solution, was also added in an amount of 1.0 to 2.0 moles/mole of ABA. The resulting combination was then heated to a temperature of 60° C. to 100° C. for a period of 30 minutes while mixing at a rate of 5 to 60 rpm. When an acid was used, sodium hydroxide was then added in an amount of 0.5 to 1.0 mole/mole of methyl sulfonic acid. The combination was further heated to a temperature of between 140° C. and 175° C. for a period between 30 minutes and 105 minutes while mixing at a rate of between 30 and 60 rpm.

While not wishing to be bound by theory, it is believed that, under the first heating conditions, the first reactive group of the linking agent reacts with the pigment through a diazonium reaction and, under the second heating conditions, the second reactive group of the linking agent reacts with the polymer, thereby forming a modified pigment comprising a pigment having an attached polymeric group.

Method C

For this method, the polymer was modified with p-phenylenediamine (PDA) by dissolving 225 g of the polymer in THF (400 mL) in a 1-liter 3-necked round bottomed flask under a nitrogen atmosphere. PDA (7.2 g) was then added, and the solution was heated to 60° C. A solution of dicyclohexyl carbodiimide (DCC) (prepared by dissolving DCC (13.8 g) in THF (100 mL)) was then added in small portions. The solution gradually turned hazy. The reaction mixture was stirred for 2 hours at 60° C. Then, heating was stopped, and the flask was cooled in an ice batch to below 5° C. The precipitated urea was filtered off, and the organic filtrate was diluted to a total volume of 900 mL with THF. The THF solution was placed in a separatory funnel and dripped into 4500 mL of water being stirred vigorously with a mechanical overhead stirrer. The resulting precipitated polymer was collected by filtration and washed three times with water. The washed precipitate was dried under vacuum at room temperature for 48 hours. Calculated amine number for the resulting polymer (assuming 100% reaction) was 15 mg KOH/g.

The pigment was combined with this amino-functionalized polymer as a melt with N-methyl pyrrolidone (NMP) as a plasticizer in a Brabender mixer (ratio of 5 grams polymer per gram of pigment, NMP in an amount of 0.04 to 0.22 grams per gram of polymer). After mixing, the melt was cooled, and sodium nitrite was added to the cooled melt, as either a 20% solution in water or as a 20% slurry in NMP, in an amount of 1.0 to 2.0 moles/mole of amine groups of the modified polymer. Optionally, methyl sulfonic acid as a 50% aqueous solution, was added in an amount of 1.0 to 2.0 moles/mole of amine groups of the modified polymer. The resulting combination was then mixed at a temperature 60° C. to 100° C. for a period of 30 minutes at a rate of 5 to 60 rpm (which controls the temperature increase during mixing).

While not wishing to be bound by theory, it is believed that, under these heating conditions, the amino-functional group of the polymer reacts with the pigment through a diazonium reaction, thereby forming a modified pigment comprising a pigment having an attached polymeric group.

The resulting products could be used as prepared. However, for the following examples, the modified pigments were further purified by grinding the crude product into a powder using a blender and then dispersing the powder in 0.1M NaOH at 15% solids by agitating in a Silverson mixer for 90 minutes. The pH of the dispersion was measured and, if necessary, additional 0.1M NaOH was added to raise the pH to greater than 12. The dispersion was then diafiltered using a Spectrum membrane (0.05 µm) with 10 volumes of 0.1M NaOH and was then further diafiltered with deionized water until the conductivity of the permeate was below 250 µS/cm. The resulting dispersion of modified pigment was then concentrated to 10% solids to yield the final dispersion. Properties of the modified pigments are shown in Table 1 below.

Example 1

The modified pigment of this example was prepared using Method A. The polymer was Joncryl 683, the amount of NMP was 0.1 grams per gram of polymer, and the amount of sodium nitrite was 2.0 moles per mole of ABA. Methyl sulfonic acid was not added. The resulting combination was heated at 78° C. for 30 minutes at 10 rpm and further heated at 140° C. for 30 minutes at 30 rpm. The product was further purified as described above, resulting in a dispersion of a modified pigment having 10.6% attached polymer, as determined by the extraction/TGA method.

Example 2

The modified pigment of this example was prepared using Method A. The polymer was Joncryl 683, the amount of NMP was 0.05 grams per gram of polymer, and the amount of sodium nitrite was 1.0 mole per mole of ABA. Methyl sulfonic acid was added in an amount of 2.0 moles per mole of ABA. The resulting combination was heated at 91° C. for 30 minutes at 15 rpm, neutralized with sodium hydroxide in an amount of 1.0 mole per mole of methyl sulfonic acid, and further heated at 175° C. for 105 minutes at 60 rpm. The product was further purified as described above, resulting in a dispersion of a modified pigment having 10.4% attached polymer, as determined by the extraction/TGA method.

Example 3

The modified pigment of this example was prepared using Method B. The polymer was Joncryl 683, the amount of water was 3.1 grams per gram of pigment to form a slurry, and the amount of sodium nitrite was 1.0 mole per mole of ABA. Further, 2.0 moles of methyl sulfonic acid were added per mole of ABA. The resulting combination was heated to 65° C. for 30 minutes at 60 rpm and then further heated, without addition of sodium hydroxide to neutralize the acid, to 170° C. for 50 minutes at 60 rpm. The product was further purified as described above, resulting in a dispersion of a modified pigment having 11.0% attached polymer, as determined by the extraction/TGA method.

Example 4

The modified pigment of this example was prepared using Method B. The polymer was Joncryl 683, the amount of water was 2.5 grams per gram of pigment to form a slurry, and the amount of sodium nitrite was 1.0 mole per mole of ABA. Further, 2.0 moles of methyl sulfonic acid were added per mole of ABA. The resulting combination was heated to 65° C. for 30 minutes at 50 rpm, neutralized with 1.0 mole of sodium hydroxide per mole of methyl sulfonic acid, and further heated to 175° C. for 80 minutes at 30-50 rpm. The product was further purified as described above, resulting in a dispersion of a modified pigment having 25.7% attached polymer, as determined by the extraction/TGA method.

Example 5

The modified pigment of this example was prepared using Method B. The polymer was Joncryl 67, the amount of water was 2.6 grams per gram of pigment to form a slurry, and the amount of sodium nitrite was 1.0 mole per mole of ABA. Further, 2.0 moles of methyl sulfonic acid were added per mole of ABA. The resulting combination was heated to 65° C. for 30 minutes at 60 rpm and then further heated, without addition of sodium hydroxide to neutralize the acid, to 163° C. for 80 minutes at 30-60 rpm. The product was further purified as described above, resulting in a dispersion of a modified pigment having 20.8% attached polymer, as determined by the extraction/TGA method.

Example 6

The modified pigment of this example was prepared using Method B. The polymer was Joncryl 67, the amount of water was 2.4 grams per gram of pigment to form a slurry, and the amount of sodium nitrite was 1.0 mole per mole of ABA. Further, 2.0 moles of methyl sulfonic acid were added per mole of ABA. The resulting combination was heated to 67° C. for 30 minutes at 60 rpm, neutralized with 1.0 mole of sodium hydroxide per mole of methyl sulfonic acid, and further heated to 168° C. for 85 minutes at 25-60 rpm. The product was further purified as described above, with the exception that, after diafiltering with the Spectrum membrane, the dispersion was further diafiltered with an AGTech membrane (0.1 µm) with 6 volumes of a 0.1M NaOH solution, and further diafiltered with deionized water until the conductivity of the permeate was below 250 µS/cm. This resulted in a dispersion of a modified pigment having 28.2% attached polymer, as determined by the extraction/TGA method.

Example 7

The modified pigment of this example was prepared using Method C. The polymer modified with PDA was Joncryl 683, and the amount of NMP used to prepare the polymer melt was 0.22 grams per gram of modified polymer. After mixing, the melt was cooled to below 100° C., and sodium nitrite was added as a slurry in NMP in an amount of 1.0 mole per mole of amine groups of the modified polymer. The resulting combination was then heated at 97° C. for 30 minutes at 15-40 rpm. The product was further purified as described above, resulting in a dispersion of a modified pigment having 11.8% attached polymer, as determined by the extraction/TGA method.

Example 8

The modified pigment of this example was prepared using Method C. The polymer modified with PDA was Joncryl 683, and the amount of NMP used to prepare the polymer melt was 0.09 grams per gram of modified polymer. After mixing, the melt was cooled to below 100° C., and sodium nitrite was added as a solution in water in an amount of 1.0 mole per mole of amine groups of the modified polymer. The resulting combination was then heated at 95° C. for 30 minutes at 7 rpm. The product was further purified as described above, resulting in a dispersion of a modified pigment having 24.9% attached polymer, as determined by the extraction/TGA method.

Example 9

The modified pigment of this example was prepared using Method C. The polymer modified with PDA was Joncryl 683, and the amount of NMP used to prepare the polymer melt was 0.11 grams per gram of modified polymer. After mixing, the melt was cooled to below 100° C., and sodium nitrite, as a solution in water, and methyl sulfonic acid were added in amounts of 1.0 mole per mole of amine groups of the modified polymer. The resulting combination was then heated at 95° C. for 30 minutes at 10 rpm. The product was further purified as described above, resulting in a dispersion of a modified pigment having 30.7% attached polymer, as determined by the extraction/TGA method.

Comparative Example 1

A comparative pigment was prepared by heating Joncryl 683 to a melt in a Brabender mixer. To this was added Black Pearls® 700 carbon black, and the resulting combination was then heated to a temperature of 140° C. for a period of 30 minutes while mixing at a rate of 30-60 RPM. The product was further purified as described above, resulting in a dispersion of a comparative pigment having 4.6% attached polymer, as determined by the extraction/TGA method.

Comparative Example 2

A comparative pigment was prepared using the procedure described in Comparative Example 2, with the exception that a polymer modified with p-phenylenediamine, prepared as described in Method C, was used. The product was further purified as described above, resulting in a dispersion of a comparative pigment having 8.3% attached polymer, as determined by the extraction/TGA method.

As the data in Table 1 shows, modified pigments comprising a pigment having attached at least one polymeric group can be prepared using embodiments of the method of the present invention, and these modified pigments have higher levels of polymer attachment than pigments prepared using comparative methods (the pigment of Comparative Example 1 was prepared using a method similar to either Method A or B, but with no linking agent, and the modified of Comparative Example 2 was prepared using a method similar to Method C, but with no activating agent). In particular, the modified pigments of Examples 3-6, which were prepared using Method B and an aqueous solvent with addition of an acid (methyl sulfonic acid) and optionally, the addition of a base (NaOH), were found to have very high polymer attachment, some exceeding 20%. When a modified polymer was used, as in Examples 7-9, polymer attachment levels exceeding 30% can be achieved with the addition of acid in a solvent that at least partially includes water.

TABLE 1

| Example # | Method | Polymer | % Attached Polymer |
|---|---|---|---|
| 1 | A | J683 | 10.6 |
| 2 | A | J683 | 10.4 |

TABLE 1-continued

| Example # | Method | Polymer | % Attached Polymer |
|---|---|---|---|
| 3 | B | J683 | 11.0 |
| 4 | B | J683 | 25.7 |
| 5 | B | J67 | 20.8 |
| 6 | B | J67 | 28.1 |
| 7 | C | PDA-J683 | 11.8 |
| 8 | C | PDA-J683 | 24.9 |
| 9 | C | PDA-J683 | 30.7 |
| Comp Ex 1 | — | J683 | 4.6 |
| Comp Ex 2 | — | PDA-J683 | 8.3 |

Examples 10-15

For each of these examples, a modified magenta pigment was prepared using SUNFAST® Magenta 122 (a quinacridone magenta pigment available from Sun Chemical Corporation), in the form of a presscake (approximately 35% solids) and Joncryl® 683 (an acrylic polymer available from BASF). The modified pigments were prepared using one of the general methods described above. Results are shown in Table 2 below.

Example 10

The modified pigment of this example was prepared using Method A. The amount of NMP was 0.06 grams per gram of polymer, and the amount of sodium nitrite was 2.0 moles per mole of ABA. Methyl sulfonic acid was not added. The resulting combination was heated at 86° C. for 30 minutes at 20 rpm and further heated at 165° C. for 85 minutes at 60 rpm. The product was further purified as described above, resulting in a dispersion of a modified pigment having 3.7% attached polymer, as determined by the UV/Vis spectral analysis method.

Example 11

The modified pigment of this example was prepared using Method A. The amount of NMP was 0.06 grams per gram of polymer, and the amount of sodium nitrite was 1.0 mole per mole of ABA. Methyl sulfonic acid was added in an amount of 2.0 moles per mole of ABA. The resulting combination was heated at 92° C. for 30 minutes at 20 rpm, neutralized with 1.0 mole of sodium hydroxide per mole of methyl sulfonic acid, and further heated at 165° C. for 105 minutes at 50 rpm. The product was further purified as described above, resulting in a dispersion of a modified pigment having 2.4% attached polymer, as determined by the UV/Vis spectral analysis method.

Example 12

The modified pigment of this example was prepared using Method B. The amount of water was 3.1 grams per gram of pigment to form a slurry, and the amount of sodium nitrite was 1.0 mole per mole of ABA. Further, 2.0 moles of methyl sulfonic acid were added per mole of ABA. The resulting combination was heated at 65° C. for 30 minutes at 50 rpm and then further heated, without addition of sodium hydroxide to neutralize the acid, to 160° C. for 40 minutes at 40-50 rpm. The product was further purified as described above, resulting in a dispersion of a modified pigment having 9.1% attached polymer, as determined by the UV/Vis spectral analysis method.

Example 13

The modified pigment of this example was prepared using Method B. The amount of water was 2.0 grams per gram of pigment to form a slurry, and the amount of sodium nitrite was 1.0 mole per mole of ABA. Further, 2.0 moles of methyl sulfonic acid were added per mole of ABA. The resulting combination was heated at 66° C. for 30 minutes at 60 rpm, neutralized with 1.0 mole of sodium hydroxide per mole of methyl sulfonic acid, and then further heated at 175° C. for 150 minutes at 30-60 rpm. The product was further purified as described above, resulting in a dispersion of a modified pigment was found having 25.0% attached polymer, as determined by the UV/Vis spectral analysis method.

Example 14

The modified pigment of this example was prepared using Method C. The polymer modified with PDA was Joncryl 683, and the amount of NMP used to prepare the polymer melt was 0.07 grams per gram of modified polymer. After mixing, the melt was cooled to 98° C., and sodium nitrite was added as a 20% solution in water in an amount of 1.0 mole per mole of amine groups of the modified polymer. The resulting combination was then mixed at 98° C. for 30 minutes at 10-25 rpm, during which the temperature rose to 121° C. The product was further purified as described above, resulting in a dispersion of a modified pigment having 17.2% attached polymer, as determined by the UV/Vis spectral analysis method.

Example 15

The modified pigment of this example was prepared using Method C. The polymer modified with PDA was Joncryl 683, and the amount of NMP used to prepare the polymer melt was 0.1 grams per gram of modified polymer. After mixing, the melt was cooled to 94° C., and sodium nitrite, as a 20% solution in water, and methyl sulfonic acid were added to the melt in amounts of 1.0 mole per mole of amine groups of the modified polymer. The resulting combination was then mixed at 94° C. for 30 minutes at 15-20 rpm, during which the temperature rose to 113° C. The product was further purified as described above, resulting in a dispersion of a modified pigment having 17.7% attached polymer, as determined by the UV/Vis spectral analysis method.

Comparative Example 3

A comparative pigment was prepared by heating Joncryl 683 to a melt in a Brabender mixer. To this was added SUN-FAST® Magenta 122 presscake (5:1 weight ratio of polymer to pigment), and the resulting combination was then heated to a temperature of 140° C. for a period of 30 minutes while mixing at a rate of 30-60 RPM, during which the temperature was found to increase to 170° C. The product was further purified as described above, resulting in a dispersion of a comparative pigment having 0% attached polymer, as determined by the UV/Vis spectral analysis method.

As the data in Table 2 shows, modified pigments comprising a pigment having attached at least one polymeric group can be prepared using embodiments of the method of the present invention, and these modified pigments have higher levels of polymer attachment than those prepared using a comparative method (the pigment of Comparative Example 3 was prepared using a method similar to either Method A or B, but with no linking agent). In particular, the modified pigment of Example 13, which was prepared using Method B and an aqueous solvent with addition of an acid (methyl sulfonic acid) and neutralization with a base (NaOH), was found to have very high polymer attachment (25.0%). When a modified polymer is used, as in Example 14-15, polymer attachment exceeding 17% can be achieved.

Comparative Example 4

A comparative modified carbon black pigment comprising carbon black having attached a polymeric group was prepared as follows. Black Pearls® 700 carbon black (available from Cabot Corporation), 4-aminophenyl-2-sulfatoethylsulfone (APSES, 0.5 mmoles/g pigment), and DI water (1.5 g/g pigment) were mixed in a Littleford-Day 1200 mixer. To this, sodium nitrite (1 mole/mole APSES) was added as 20% solution over 30 minutes while mixing at 40° C. An additional amount of DI water (1 g/g pigment) was then added, and this was then mixed for 30 minutes at 40° C., resulting in the formation of a carbon black pigment having attached phenyl-2-(sulfatoethylsulfone) group. A further amount of DI water was added (3.3 g/g pigment), and the resulting dispersion was then purified by centrifugation followed by diafiltration using DI water (5 volumes).

This dispersion (17% solids) was then combined in a stirred tank reactor with pentaethylenehexamine (PEHA, (1.25 mmole/g pigment), DI water (enough to make an 18% solids dispersion), and a 10% aqueous NaOH solution (to increase the pH>12) and mixed for 180 minutes at room temperature, forming a modified carbon black having attached amine groups. To this was then added concentrated HCl to reduce the pH to 3, and the resulting dispersion of carbon black having attached amine groups was diafiltered to a conductivity of <250 μS/cm and a final solids concentration of 15%.

This dispersion was then mixed with Joncryl 683 (1 g/g pigment) as 15 wt % solution in water containing an equimolar amount of ammonium hydroxide based on the polymer acid number for at least 2 hours at room temperature. The resulting mixture was spray dried, and the product was oven cured at 160° C. for 18 hours, forming a comparative modified carbon black comprising carbon black having attached polymeric groups. This was then combined with DI water and NaOH aqueous solution to make a 21% solids dispersion at pH>12 and was mixed for 180 minutes at 50° C. Finally, enough DI water was added to make a 16 wt % solids dispersion of the comparative modified carbon black. This was purified as described above by diafiltration.

Example 16

The particle size and large particles count (LPC) of the dispersions of modified pigments of Example 3, Example 4, and Example 6 were determined. The average particle size was measured using a Microtrac UPA 150, and the large particle count (number of particles having a size greater than 500 nm in a 1 mL sample at 15% solids) was measured using an Accusizer 780 optical particle sizer (available from PSS NICOMP). Results are shown in Table 3 below.

TABLE 2

| Example # | Method | Polymer | % Attached Polymer |
|---|---|---|---|
| 10 | A | J683 | 3.7 |
| 11 | A | J683 | 2.4 |
| 12 | B | J683 | 9.1 |
| 13 | B | J683 | 25.0 |
| 14 | C | PDA-J683 | 17.2 |
| 15 | C | PDA-J683 | 17.7 |
| Comp Ex 3 | — | J683 | 0 |

TABLE 3

| Example # | Average Particle Size (nm) | Large Particle Count |
|---|---|---|
| 3 | 118 | $1.0 \times 10^9$ |
| 4 | 144 | $4.9 \times 10^8$ |
| 6 | 116 | $9.3 \times 10^8$ |

As the result in Table 3 show, the modified pigments prepared using an embodiment of the method of the present invention have an average particle size less than 150 nm. In addition, these dispersions have been found to have a very low large particle count ($10^9$ or less). By comparison, the average particle size of the dispersion of Comparative Example 4 was found to be 316 nm and the LPC value was greater than $10^{10}$. Thus, the modified pigment of the present invention form dispersions having a smaller average particle size and lower LPC than a modified pigment having the same attached polymeric group but prepared using a comparative method. The small particle size and low LPC value would be expected to provide increased dispersion stability and reliability when used in an inkjet ink printing application. Thus, it would be expected that the modified pigments prepared using the methods of the present invention could be used in inkjet ink compositions and would result in improved printing performance.

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method of forming a modified pigment comprising a pigment having attached at least one polymeric group, the method comprising the steps of:
   i) forming a polymer melt comprising an acid-functionalized polymer and an optional plasticizer;
   ii) combining, in any order, a pigment, an optional activating agent, and the polymer melt under high-intensity mixing conditions; and
   iii) reacting the acid-functionalized polymer and the pigment to form the modified pigment, wherein the acid-functionalized polymer is attached to the pigment via at least one of the acid-functionalized reactive groups on the acid-functionalized polymer.

2. The method of claim 1 wherein the method further comprises the step of activating the polymer melt prior to step iii).

3. The method of claim 1, wherein, when the polymer melt comprises a plasticizer, the plasticizer is present in a range between about 0.1% and about 20.0% based on the weight of the polymer.

4. The method of claim 1 comprising forming an aqueous dispersion of the modified pigment.

5. The method of claim 1 wherein the optional activating agent comprises a nitrite.

6. The method of claim 5 wherein the mixture is activated under high intensity mixing conditions.

7. The method of claim 1 wherein the polymer and the pigment are combined in a ratio of at least about 1.0 parts polymer to about 1.0 part pigment.

8. The method of claim 1 wherein the polymer and the pigment are combined in a ratio of not greater than about 6.5 parts polymer to about 1.0 part pigment.

9. The method of claim 1 wherein the pigment is carbon black.

* * * * *